(12) United States Patent
Murakami et al.

(10) Patent No.: US 10,676,017 B2
(45) Date of Patent: Jun. 9, 2020

(54) VEHICULAR LIGHTING DEVICE

(71) Applicant: KOITO MANUFACTURING CO., LTD., Tokyo (JP)

(72) Inventors: Kentarou Murakami, Shizuoka (JP); Hitoshi Takeda, Shizuoka (JP); Takao Muramatsu, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 297 days.

(21) Appl. No.: 15/784,147

(22) Filed: Oct. 15, 2017

(65) Prior Publication Data

US 2018/0043820 A1     Feb. 15, 2018

Related U.S. Application Data

(63) Continuation of application No. PCT/JP2016/061803, filed on Apr. 12, 2016.

(30) Foreign Application Priority Data

Apr. 17, 2015  (JP) .................................. 2015-085236
Feb. 16, 2016  (JP) .................................. 2016-027052

(51) Int. Cl.
*B60Q 1/08*      (2006.01)
*H05B 45/00*     (2020.01)
(Continued)

(52) U.S. Cl.
CPC .............. *B60Q 1/085* (2013.01); *B60Q 1/12* (2013.01); *B60Q 1/14* (2013.01); *B60Q 1/143* (2013.01);
(Continued)

(58) Field of Classification Search
CPC ........ F21S 41/675; F21S 41/00; F21S 41/635; F21S 41/67; B60Q 2300/41;
(Continued)

(56) References Cited

U.S. PATENT DOCUMENTS 6,876,153 B2    4/2005  Ito et al.
9,212,800 B2 *  12/2015  Tanaka .................... F21S 41/19
(Continued)

FOREIGN PATENT DOCUMENTS

CN        103492228 A      1/2014
DE     10 2009 025678      1/2010
(Continued)

OTHER PUBLICATIONS

International Preliminary Report on Patentability for corresponding PCT application PCT/JP2016/061803, dated Oct. 17, 2017, ISA-JP.
(Continued)

*Primary Examiner* — Vibol Tan
(74) *Attorney, Agent, or Firm* — Buchanan Ingersoll & Rooney PC

(57) ABSTRACT

A vehicular lighting device includes a scanning light source. The scanning light source includes a semiconductor light source, and scans the output light of the semiconductor light source in a forward region ahead of the lighting device. A lighting circuit changes the light amount of the semiconductor light source in multiple levels in synchronization with the scanning of the scanning light source.

13 Claims, 12 Drawing Sheets

(51) Int. Cl.
*F21S 41/00* (2018.01)
*B60Q 1/14* (2006.01)
*F21S 41/675* (2018.01)
*H05B 45/10* (2020.01)
*H05B 45/14* (2020.01)
*H05B 45/50* (2020.01)
*B60Q 1/12* (2006.01)

(52) U.S. Cl.
CPC ............ *F21S 41/00* (2018.01); *F21S 41/675* (2018.01); *H05B 45/00* (2020.01); *H05B 45/10* (2020.01); *H05B 45/14* (2020.01); *H05B 45/50* (2020.01); *B60Q 1/122* (2013.01); *B60Q 2300/122* (2013.01); *B60Q 2400/50* (2013.01)

(58) Field of Classification Search
CPC .................... B60Q 2300/42; B60Q 1/1423; B60Q 1/0023; B60Q 2300/122; B60Q 1/12; B60Q 2300/322; B60Q 2300/332; B60Q 1/06; B60Q 1/14; B60Q 1/08; B60Q 1/085; B60Q 1/1407; B60Q 1/1415; H05B 33/0845; H05B 33/0842; H05B 33/0848; F21W 2102/13; F21W 2102/00; G02B 26/0833
See application file for complete search history.

(56) References Cited

U.S. PATENT DOCUMENTS

| | | | |
|---|---|---|---|
| 9,890,910 B2* | 2/2018 | Yamamura | F21S 10/026 |
| 9,903,557 B2* | 2/2018 | Matsuno | F21S 41/24 |
| 9,909,731 B2* | 3/2018 | Yamamura | F21S 41/147 |
| 10,118,535 B2* | 11/2018 | Park | B60R 1/00 |
| 10,192,124 B2* | 1/2019 | Yamamura | B60Q 1/143 |
| 10,259,380 B2* | 4/2019 | Ko | F21S 43/241 |
| 2004/0075394 A1 | 4/2004 | Ito et al. | |
| 2014/0028982 A1 | 1/2014 | Hadrath | |
| 2014/0042325 A1* | 2/2014 | Yamamura | B60Q 1/0023 250/347 |
| 2014/0307456 A1* | 10/2014 | Ishida | B60Q 1/115 362/513 |
| 2014/0313755 A1* | 10/2014 | Tanaka | F21S 41/19 362/514 |

FOREIGN PATENT DOCUMENTS

| | | |
|---|---|---|
| DE | 10 2012 005805 | 9/2012 |
| DE | 10 2012 100141 | 7/2013 |
| EP | 2 548 768 | 1/2013 |
| EP | 2 690 352 | 1/2014 |
| EP | 2 700 538 | 2/2014 |
| JP | 63312245 A | 12/1988 |
| JP | 2008205357 A | 9/2008 |
| JP | 2010006109 A | 1/2010 |
| JP | 2011157023 A | 8/2011 |
| JP | 2012027267 A | 2/2012 |
| JP | 2012224317 A | 11/2012 |
| JP | 5369014 B2 | 12/2013 |
| JP | 2014-029858 A | 2/2014 |
| JP | 2014216600 A | 11/2014 |
| WO | 2013099144 A | 7/2013 |
| WO | 2015/032795 | 3/2015 |
| WO | 2015045946 A | 4/2015 |

OTHER PUBLICATIONS

International Search Report for corresponding PCT application PCT/JP2016/061803, dated Jul. 19, 2016, ISA-JP.
Extended European Search Report on corresponding EP Application No. 16780041.6, dated Dec. 10, 2018.
Japanese Office Action and English Translation issued in corresponding Japanese Application No. 2017-512541, dated Mar. 3, 2020, 9 pages.
Chinese Office Action and English Translation issued in corresponding Chinese Application No. 201680022392.9, dated Mar. 26, 2020, 17 pages.

* cited by examiner

VEHICULAR LIGHTING DEVICE

REFERENCE TO RELATED APPLICATIONS

This application is a continuation of PCT Patent Application No. PCT/JP2016/061803, filed on Apr. 12, 2016, which claims the benefit of Japanese Patent Application No. 2016-027052, filed Feb. 16, 2016 and Japanese Patent Application No. 2015-085236, filed on Apr. 17, 2015, which are hereby incorporated herein by reference.

BACKGROUND OF THE INVENTION

1. Field of the Invention

The present invention relates to a vehicular lighting device employed in a vehicle or the like.

2. Description of the Related Art

Typical vehicular lighting devices are capable of switching between a low-beam mode and a high-beam mode. The low-beam mode is used to illuminate a close range with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, this leads to a problem of imparting glare to a pedestrian or otherwise a driver of a leading vehicle ahead of the vehicle.

In recent years, the ADB (Adaptive Driving Beam) technique has been proposed in which the high-beam distribution pattern is dynamically and adaptively controlled based on the state of the surroundings of the vehicle. With the ADB technique, the presence or absence of a leading vehicle, an oncoming vehicle, or a pedestrian ahead of the vehicle is detected, and the illumination is reduced for a region that corresponds to such a vehicle or pedestrian thus detected, thereby reducing glare imparted to such a vehicle or pedestrian.

As a method for providing the ADB function, various methods have been proposed, such as a shutter method in which an actuator is controlled, a rotary method, an LED array method, and so forth. With the shutter method or the rotary method, this allows a lighting off region (shielded region) to have a continuously variable width. However, the number of the lighting off regions is limited to only one. The LED array method allows a multiple number of lighting off regions to be designed. However, the width of each lighting off region is limited depending on the illumination width of each LED chip. Thus, the LED array method leads to discrete lighting off regions, which is a problem.

In order to solve these problems, the present applicant has proposed a scanning method as an ADB method (see Japanese Patent Application Laid Open No. 2012-224317 and No. 2010-6109).

In the scanning method, light is input to a rotated reflector (blade), and the input light is reflected with an angle that corresponds to the rotational position of the reflector. Furthermore, the lighting on/off of a light source is switched according to the rotational position of the reflector while scanning the reflected light to a forward region ahead of the vehicle, so as to form a desired light distribution pattern in a forward region ahead of the vehicle.

In the scanning method described in Japanese Patent Application Laid Open No. 2010-6109, the lighting on/off of the light source is switched in a time sharing manner while maintaining the amount of current that flows through the light source. This allows a glare-free function, i.e., a function of shielding a predetermined area, to be provided in a simple manner. However, the light intensity for the illuminated region is limited to a substantially constant value.

On the other hand, in order to provide improved safety, there is a demand for a function of raising the luminance for only a hot zone within the lighting on region, and an electronic swivel function of changing the light intensity peak position based on the steering information.

SUMMARY OF THE INVENTION

The present invention has been made in order to solve such problems. Accordingly, it is an exemplary purpose of an embodiment of the present invention to provide a lighting circuit that is capable of generating various kinds of light distribution patterns in addition to providing the glare-free function.

A vehicular lighting device comprises: a scanning light source comprising a semiconductor light source, and structured to scan an output light of the semiconductor light source in a forward region ahead of the lighting device; and a lighting circuit structured to change a light amount of the semiconductor light source in multiple levels in synchronization with the scanning of the scanning light source.

With the embodiment, by changing the light amount of the semiconductor light source in multiple levels for every scanning period, this allows the light intensity to be controlled for each coordinate position or for each region. This provides various light distribution patterns for various kinds of functions such as a hot zone generating function, an electronic swivel function, and so forth, in addition to a glare-free function. It should be noted that an operation represented by the phrase "the light amount is changed in multiple levels" in the present specification includes an operation in which the light amount is changed in a non-discrete manner, i.e., continuously, in addition to an operation in which the light amount is changed between multiple discrete levels.

Also, in addition to the semiconductor light source, the scanning light source may further comprise a reflector structured to receive the output light of the semiconductor light source, and to repeat a predetermined periodic movement so as to scan a reflected light in a forward region ahead of the lighting device. Also, the lighting circuit may be structured to change the light amount of the semiconductor light source in multiple levels in synchronization with the movement of the reflector.

Also, the lighting circuit may be structured to drive the semiconductor light source such that an intensity distribution of a beam emitted to the forward region monotonically increases or otherwise monotonically decreases with a peak position as a base point.

In this control operation, the slope with which the beam intensity is monotonically increased and the slope with which the beam intensity is monotonically reduced may preferably be changed according to a change in the peak position. This allows the semiconductor light source to be controlled in a simple manner.

The light amount of the semiconductor light source may be monotonically increased in a region from one end of the light distribution pattern to be formed in the forward region toward the light intensity peak position. Also, the light amount may be monotonically reduced in a region from the peak position toward the other end of the light distribution pattern.

Also, the light amount of the semiconductor light source may be set to a predetermined base value at a start time point that corresponds to one end of a light distribution pattern formed in the forward region. Also, the light amount of the semiconductor light source may be set to a peak value at a peak time point that corresponds to the peak position. Also, the light amount of the semiconductor light source may be set to the base value at an end time point that corresponds to the other end of the light distribution pattern.

Also, the lighting circuit may be structured to control the light amount of the semiconductor light source by shifting a predetermined basic waveform along a time axis according to the peak position.

By designing the waveform of the lighting control operation to have a uniform shape, such an arrangement allows the control operation to be simplified.

Also, the basic waveform may include a first period in which a value thereof is set to a base value, a second period in which the value thereof is monotonically increased from the base value to a peak value, a third period in which the value thereof is monotonically reduced from the peak value to the base value, and a fourth period in which the value thereof is set to the base value.

Also, the light amount of the semiconductor light source is changed with a constant slope. By designing the change with a constant slope, such an arrangement allows the control operation to be further simplified.

Also, the peak position may correspond to the steering angle. This provides an electronic swivel function.

Also, the peak position may correspond to information acquired by a camera. This provides a hot zone generating function.

Also, the vehicular lighting device may be structured to draw a pattern on a road surface. Also, the peak position may correspond to an end of the pattern that is most distant from a vehicle.

This resolves a problem of non-uniformity of the light intensity over the road surface depending on the distance from the lighting device.

Also, the lighting circuit may comprise a constant current driver structured to supply a driving current to the semiconductor light source. Also the constant current driver may comprise: a switching converter; and a converter controller employing a hysteresis control method, structured to compare a detection value of the driving current with an upper threshold value and a lower threshold value that correspond to a target value of the light amount of the semiconductor light source, and to drive the switching converter according to a comparison result.

This allows the driving current to be changed with a high rate in a time scale that is shorter than the scanning period.

Also, the lighting circuit may further comprise a dimming signal generating unit structured to generate a dimming signal that periodically changes in multiple levels in synchronization with a movement of a reflector. Also, the constant current driver may be structured to supply the driving current that corresponds to the dimming signal to the semiconductor light source.

Also, the dimming signal generating unit may comprise a position detector structured to generate a position detection signal that indicates a timing at which a predetermined reference portion of the reflector passes through a predetermined position. Also, the dimming signal generating unit may be structured to generate the dimming signal in synchronization with the position detection signal.

It should be noted that any combination of the aforementioned components, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
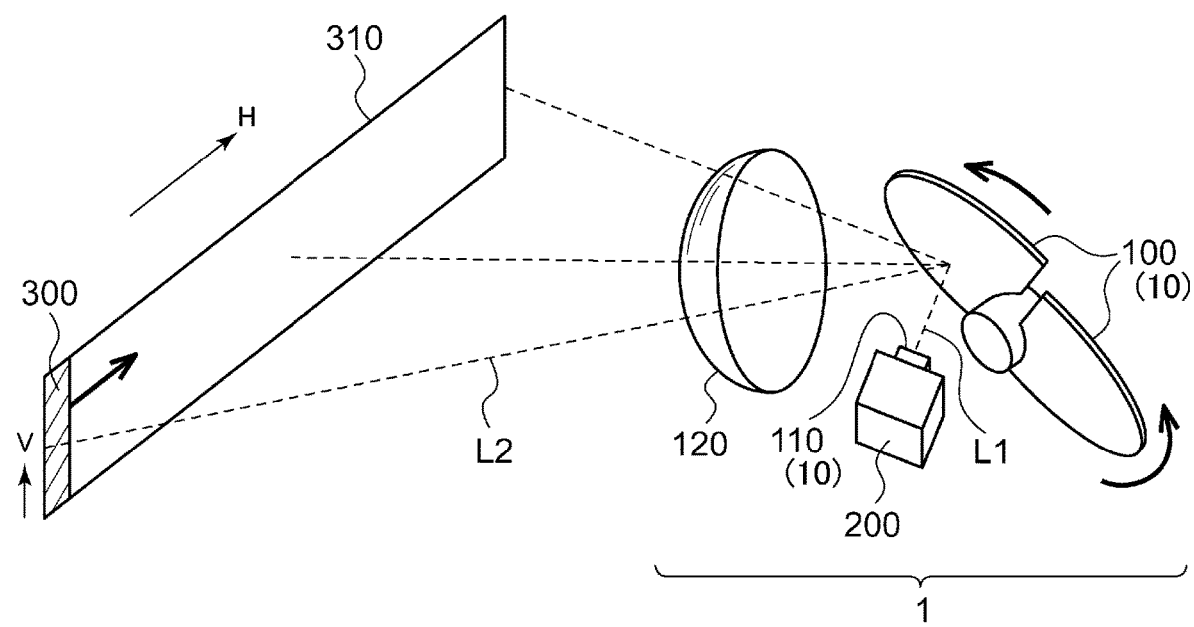
FIG. 1 is a perspective view showing a schematic configuration of a vehicular lighting device according to an embodiment.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

FIG. 1 is a perspective view showing a schematic configuration of a vehicular lighting device 1 according to an embodiment. The vehicular lighting device 1 shown in FIG. 1 has an ADB function using a scanning method, which is capable of generating various kinds of light distribution patterns in a forward region ahead of the vehicle. The vehicular lighting device 1 mainly includes a scanning light source 10, a projector lens 120, and a lighting circuit 200.

The scanning light source 102 includes a light source 110, and scans the output light of the light source 110 on the forward side ahead of the vehicle. The scanning light source 102 may include multiple light sources 110. However, for ease of understanding and simplicity of description, description will be made regarding an arrangement in which the scanning light source 102 includes a single light source 110. As the light source 110, a semiconductor light source such as an LED (light-emitting diode), laser diode, or the like, may be employed. The scanning light source 10 includes a blade 100 in addition to the light source 110. By repeating a predetermined periodic movement of the blade 100 in a state in which it receives an output light L1 of the light source 110, a reflected light L2 thereof is scanned along the horizontal direction (H direction in the drawing) on the forward side ahead of the vehicle. In the present embodiment, the blade 100 is mounted on a rotor of an unshown motor, and is rotationally driven. At a given time point, the input light L1 input to the blade 100 is reflected with a reflection angle that corresponds to the position of the blade 100 (rotational angle of the rotor), which forms an illumination region 300 on the forward side ahead of the vehicle. The illumination region 300 has respective predetermined widths in the horizontal direction (H direction) and the vertical direction (V direction).

The blade 100 is rotated, which changes the reflection angle, thereby scanning the position (scanning position) of the illumination region 300 along the horizontal direction (H direction). By repeatedly performing such a scanning operation with high speed, e.g., at a frequency of 50 Hz or more, this forms a light distribution pattern 310 on the forward side ahead of the vehicle.

The lighting circuit 200 controls the light amount (luminance) of the light source 110 in synchronization with the scanning of the scanning light source 10, and specifically, in synchronization with the periodic movement of the blade 100 so as to obtain a desired light distribution pattern 310. During the scanning, the light intensity of the illumination region 300 is controlled for every scanning position. This forms a non-zero light intensity region (lighting on region $R_{ON}$) and a zero light intensity region (lighting off region $R_{OFF}$). The light distribution pattern 310 is a combination of such a lighting on region $R_{ON}$ and a lighting off region $R_{OFF}$.

Figure 2:
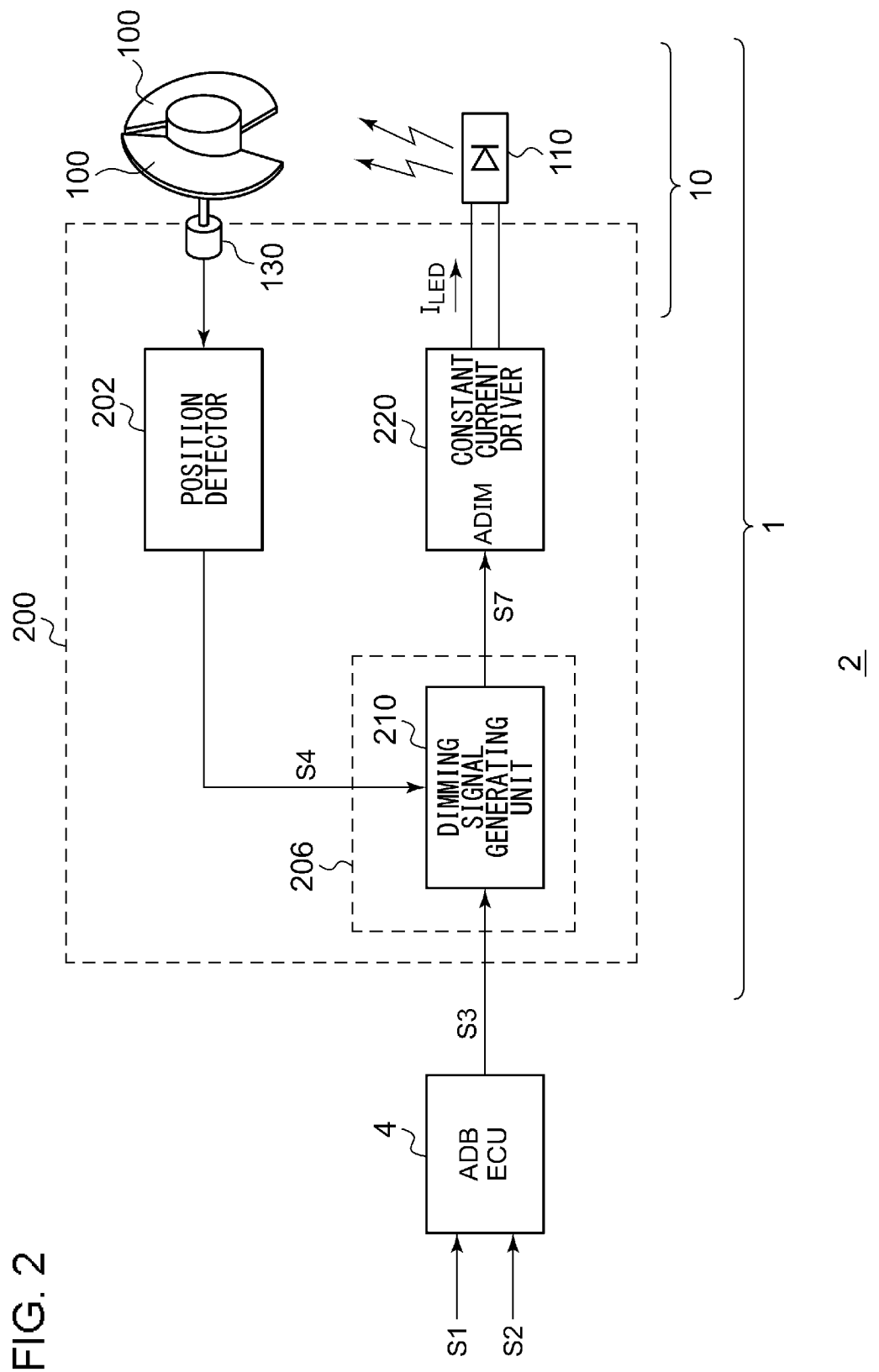
FIG. 2 is a block diagram showing a lighting device system including the vehicular lighting device according to the embodiment.

Next, description will be made regarding a configuration of the lighting circuit 200 of the vehicular lighting device 1. FIG. 2 is a block diagram showing a lighting device system 2 including the vehicular lighting device 1 according to an embodiment. An ADB ECU 4 may be mounted on the vehicle side. Also, the ADB ECU 4 may be built into the vehicular lighting device 1.

The scanning light source 10 includes a motor 130 in addition to the light source 110 and the blade 100. The blade 100 is mounted on a positioning apparatus such as the motor 130 or the like. The angle of incidence (and angle of reflection) of the output light L1 to the blade 100 is changed according to the rotation of the motor 130, which scans the reflected light L2 on the forward side ahead of the vehicle. The ADB ECU 4 receives camera information S1 and vehicle information S2. The ADB ECU 4 detects a situation that occurs on the forward side ahead of the vehicle, and specifically, detects the presence or absence of an oncoming vehicle, the presence or absence of a leading vehicle, the presence or absence of a pedestrian, and so on. Furthermore, the ADB ECU 4 detects the current vehicle speed, steering angle, and so on, based on the vehicle information S2. The ADB ECU 4 determines a light distribution pattern to be illuminated on the forward side ahead of the vehicle, and transmits, to the vehicular lighting device 1, information (light distribution pattern information) S3 which indicates the light distribution pattern.

Description will be made in the present embodiment regarding a light distribution pattern relating to an electronic swivel function. The ADB ECU 4 determines the peak position to be most brightly illuminated, based on the steering angle or the vehicle speed. The distribution pattern information S3 may include the peak position data as angle information $\theta_{PEAK}$. For example, the angle information θ is generated with the left end of the light distribution pattern 310 as $\theta_L$, and with the right end thereof as $\theta_R$. The angle information θ may be normalized such that the center (intersection of the H line and the V line) of the light distribution pattern 310 is set to zero.

The lighting circuit 200 changes the light amount (luminance) of the light source 110 in multiple levels based on the light distribution pattern information S3 in synchronization with the rotation of the blade 100. For example, the lighting circuit 200 mainly includes a constant current driver 220, a dimming signal generating unit 210, and a position detector 202.

The position detector 202 is provided in order to detect the position of the blade 100, i.e., the current beam scanning position. The position detector 202 generates a position detection signal S4 that indicates a timing at which a predetermined reference portion of the blade 100 passes through a predetermined position. For example, the reference portion may be defined by the ends of two blades (a gap between them). Also, the reference portion may be defined by the center of each blade. That is to say, a desired position may be used as the reference portion.

A Hall element may be mounted on the motor 130 that rotates the blade 100. In this case, a Hall signal output from the Hall element has a periodic waveform that corresponds to the rotor position, i.e., the blade position. The position detector 202 may detect a timing at which the polarity of the Hall signal is inverted. Specifically, the position detector 202 may be configured as a Hall comparator that compares a pair of Hall signals.

For ease of understanding and simplicity of description, description will be made in the present embodiment regarding an arrangement in which the beam illumination region 300 is scanned in a direction from the left end to the right end of the light distribution pattern 310, and the position detection signal S4 is a signal that indicates the left end.

The dimming signal generating unit 210 generates a dimming signal S7 that periodically changes in multiple levels in synchronization with the movement of the blade 100. The dimming signal S7 is not a binary signal that indicates the on/off state, but a multi-level signal. The number of levels thereof is not restricted in particular. However, the dimming signal S7 is configured as a signal with at least four levels, and is preferably configured as a signal with eight or more levels. Also, the dimming signal S7 may be configured as a 32-level, 64-level, or 128-level signal. Also, different numbers of levels may be set for the dimming signal S7. The dimming signal S7 corresponds to a driving current $I_{LED}$ that flows through the light source 110 in a one-to-one manner. Accordingly, the dimming signal S7 also corresponds to the light amount of the light source 110 in a one-to-one manner.

As a method for changing the light amount of the light source 110, an analog dimming (analog light reduction) method and a PWM dimming method are known. In the analog dimming method, the amount of current (amplitude) of the driving current $I_{LED}$ is adjusted. In the PWM dimming method, the driving current $I_{LED}$ is turned on and off in a time sharing manner, and the on/off time ratio is adjusted. The dimming signal S7 generated by the dimming signal generating unit 210 is supplied to an analog dimming input ADIM of the constant current driver 220. The dimming signal generating unit 210 generates the driving current $I_{LED}$ having an amount of current that is proportional to the dimming signal S7.

The lighting circuit 200 drives the light source 110 so as to monotonically increase or otherwise monotonically reduce the intensity distribution of the beam emitted to the forward region, i.e., the light amount of the light source 110, with the peak position as a base point. Description will be made regarding several methods for controlling the light amount of the light source 110.

First Control Method

Figure 3:
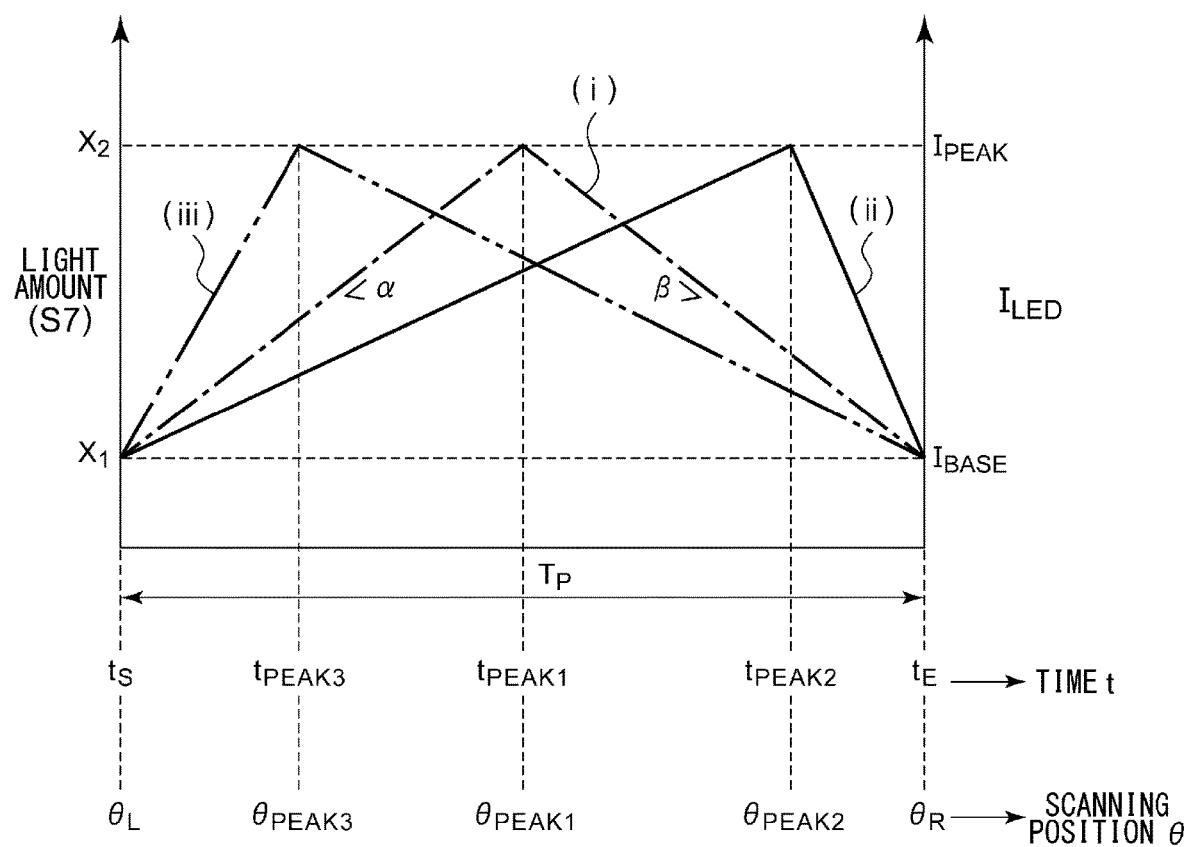
FIG. 3 is a diagram showing an example of temporal change in the light amount of a light source.

FIG. 3 is a diagram showing an example of temporal change in the light amount of the light source 110. As described above, the light amount corresponds to the driving current $I_{LED}$ in a one-to-one manner. Furthermore, the driving current $I_{LED}$ corresponds to the dimming signal S7 in a one-to-one manner. Accordingly, the waveforms shown in FIG. 3 each indicate a waveform of the dimming signal S7, and also each indicate a waveform of the driving current $I_{LED}$.

The horizontal axis represents the time t, which corresponds to the scanning position θ. As described above, the light distribution pattern information S3, which indicates the light intensity peak position $θ_{PEAK}$, is supplied to the dimming signal generating unit 210. The waveforms (i) through (iii) shown in FIG. 3 are generated with different peak positions $θ_{PEAK}$.

The light amount of the light source 110 has a waveform that monotonically increases from one end (the left end) $θ_L$ of the light distribution pattern 310 toward the peak position $θ_{PEAK}$, and that monotonically decreases from the peak position $θ_{PEAK}$ toward the other end (the right end) $θ_R$.

More specifically, the light amount (dimming signal S7) is set to a predetermined base value $X_1$ at a start time point $t_S$ that corresponds to one end (the left end) $θ_L$ of the light distribution pattern. At the peak time point $t_{PEAK}$ that corresponds to the peak position $θ_{PEAK}$, the light amount is set to a peak value $X_2$. At an end time point $t_E$ that corresponds to the other end (the right end) OR of the light distribution pattern 310, the light amount is set to the base value $X_1$. The start time point $t_S$ can be detected based on the aforementioned position detection signal S4.

FIG. 3 shows the waveform (i) in a case of forming a light distribution pattern having a light intensity peak at its center, the waveform (ii) in a case of forming a light distribution pattern having a light intensity peak that is closer to the right side than the center, and the waveform (iii) in a case of forming a light distribution pattern having a light intensity peak that is closer to the left side than the center. A suitable peak position $θ_{PEAK}$ is input according to the steering angle. The dimming signal S7 is generated such that it exhibits a maximum value at the peak position $θ_{PEAK}$.

The waveforms (i) through (iii) shown in FIG. 3 can be generated in a simple manner. That is to say, by providing the peak position $θ_{PEAK}$, the peak time point $t_{PEAK}$ that corresponds to the peak position $θ_{PEAK}$ can be obtained. The dimming signal generating unit 210 calculates the rising slope α based on the following Expression (1).

$$α=(X_2-X_1)/(t_{PEAK}-t_S) \quad (1)$$

Furthermore, the dimming signal generating unit 210 calculates the falling slope β based on the following Expression (2).

$$β=-(X_2-X_1)/(t_E-t_{PEAK}) \quad (2)$$

The dimming signal generating unit 210 increases the signal value from the base value $X_1$ to the peak value $X_2$ with a constant slope α in a period from the time point $t_S$ to the time point $t_{PEAK}$. Subsequently, the dimming signal generating unit 210 reduces the signal value from the peak value $X_2$ to the base value $X_1$ with a constant slope β in a period from the time point $t_{PEAK}$ to the time point $t_E$.

As described above, the dimming signal generating unit 210 is capable of generating a suitable dimming signal S7 by means of a simple calculation operation.

Second Control Method

Figure 4A:
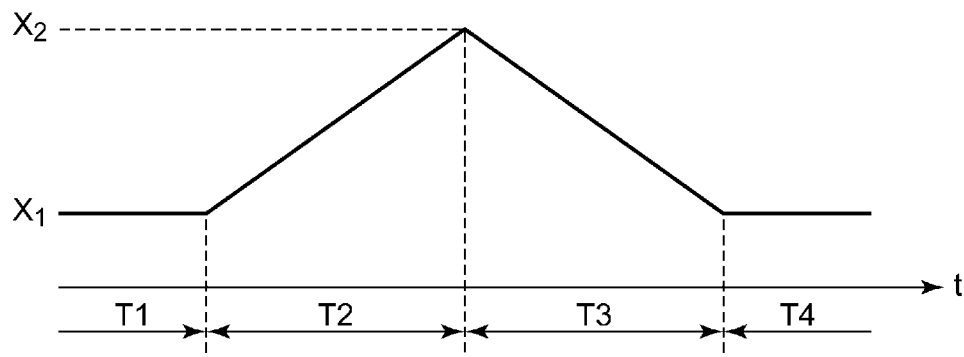
FIGS. 4A through 4D are diagrams each showing another example of temporal change in the light amount of the light source.
Figure 4B:
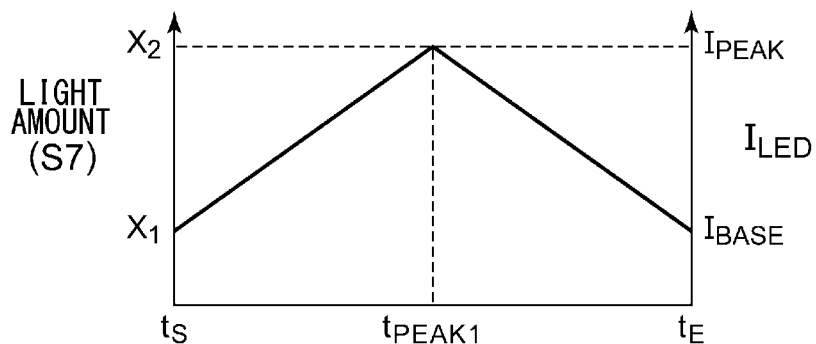
Figure 4C:
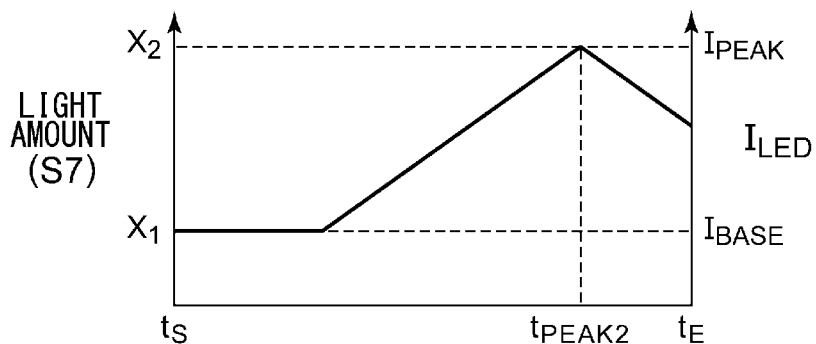
Figure 4D:
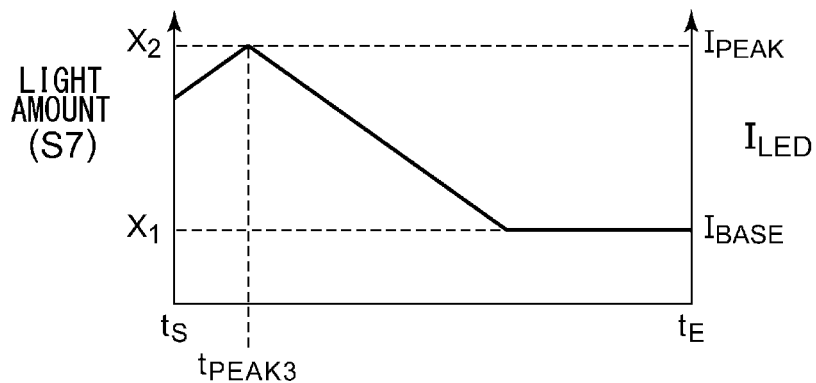

FIGS. 4A through 4D are diagrams each showing another example of temporal change in the amount of light provided by the light source 110. The dimming signal generating unit 210 holds a basic waveform A defined as shown in FIG. 4A. The basic waveform A has a first period T1 in which its value is set to the base value $X_1$, a second period T2 in which its value is monotonically increased from the base value $X_1$ to the peak value $X_2$, a third period T3 in which its value is monotonically reduced from the peak value $X_2$ to the base value $X_1$, and a fourth period T4 in which its value is set to the base value $X_1$. In other words, the light amount of the light source 110 changes according to the basic waveform. Description will be made regarding an arrangement in which the slope set for the second period T2 and the slope set for the third period T3 are each constant. The basic waveform A may be held in the form of a calculation expression or otherwise in the form of a waveform table.

As shown in FIGS. 4A through 4D, the dimming signal generating unit 210 generates the dimming signal S7 by shifting the basic waveform A in the positive direction or otherwise the negative direction along the time axis according to the peak position $\theta_{PEAK}$. That is to say, the light amount of the light source 110 has a waveform obtained by shifting the basic waveform A in the positive direction or otherwise the negative direction along the time axis according to the peak position $\theta_{PEAK}$. By providing the peak position $\theta_{PEAK}$, the peak time point $t_{PEAK}$ that corresponds to the peak position $\theta_{PEAK}$ can be obtained. The dimming signal generating unit 210 shifts the basic waveform A such that the peak of the basic waveform A matches the peak time point $t_{PEAK}$.

With the second control method, such a suitable dimming signal S7 can be generated by means of a calculation operation. Furthermore, the second control method allows the dimming signal S7 to have a more complicated waveform than with the first control method.

The above is the configuration of the vehicular lighting device 1. With the vehicular lighting device 1, by changing the driving current $I_{LED}$ in multiple levels in a periodic scanning operation, this allows the light intensity to be controlled in multiple levels for every coordinate position or otherwise for every region. This provides various distribution patterns for various kinds of functions such as an electronic swivel function in addition to a glare-free function.

The present invention encompasses various kinds of apparatuses and circuits that can be regarded as a block configuration or a circuit configuration shown in FIG. 2, or otherwise that can be derived from the waveform diagrams shown in FIGS. 3 and 4 or the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

Figure 5:
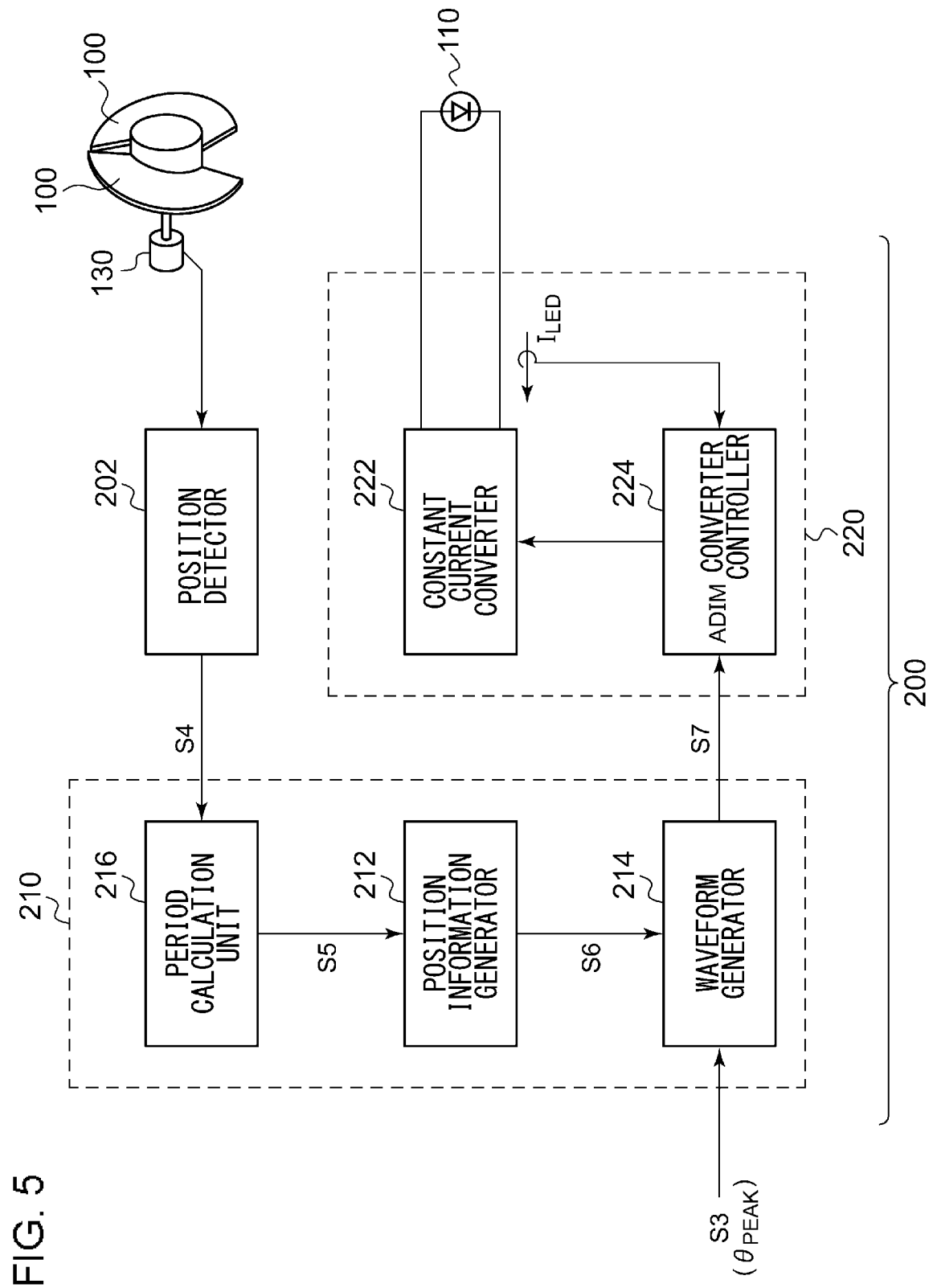
FIG. 5 is a circuit diagram showing an example configuration of a lighting circuit.

FIG. 5 is a circuit diagram showing an example configuration of the lighting circuit 200. The constant current driver 220 includes a switching converter 222 and a converter controller 224.

The switching converter 222 is configured as a step-up converter, a step-down converter, or otherwise a step-up/step-down converter. The converter controller 224 receives a current detection signal S8 that indicates a detection value of the driving current $I_{LED}$, and feedback controls the switching converter 222 such that the current detection signal S8 matches the dimming signal S7.

The circuit configurations of the switching converter 222 and the converter controller 224 and the control methods for them are not restricted in particular It should be noted that the periodic dimming signal S7 has a frequency that matches the scanning frequency for the blade 100, which is set to 100 Hz or more. Accordingly, the constant current driver 220 is required to have a responsivity that allows the driving current $I_{LED}$ to be changed with high speed in a time scale that is shorter than 100 ms.

Figure 6:
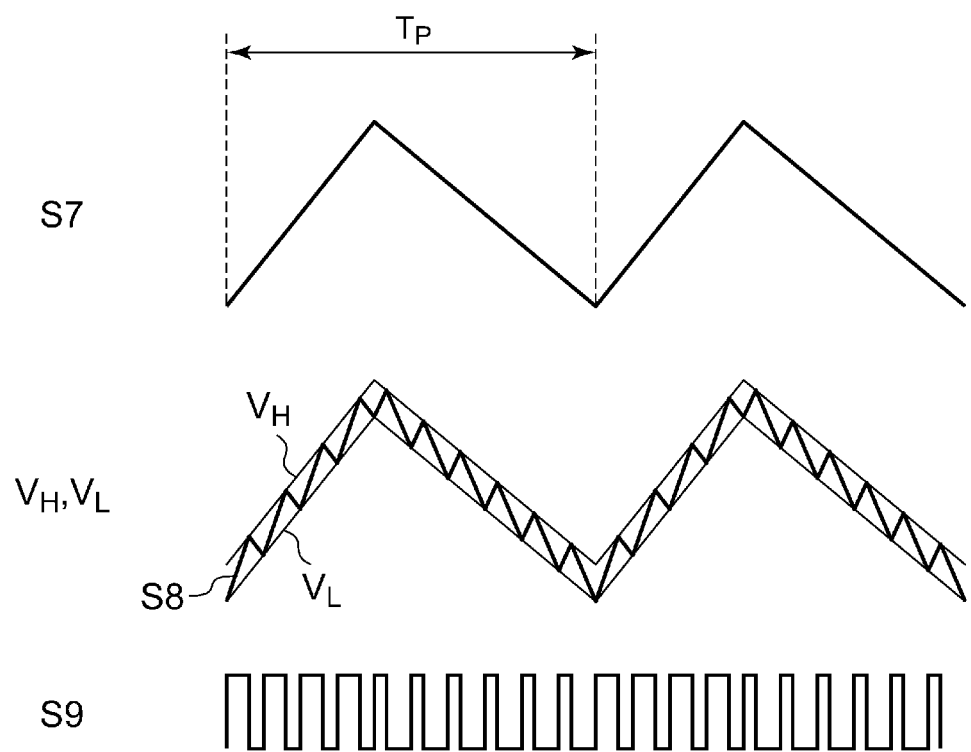
FIG. 6 is an operation waveform diagram showing the operation of a constant current driver shown in FIG. 5.

Accordingly, in a case of driving the switching converter 222 so as to support an output voltage that is lower than the input voltage as a driving condition, a step-down converter is preferably employed. In a case of driving the switching converter 222 so as to support voltages that are both higher and lower than the input voltage as a driving condition, a Cuk converter is preferably employed. Also, the converter controller 224 may employ a hysteresis control (Bang-Bang control) method that provides high responsivity. FIG. 6 is an operation waveform diagram showing the operation of the constant current driver 220 shown in FIG. 5. The converter controller 224 generates an upper threshold voltage VH and a lower threshold voltage L based on the dimming signal S7 such that they are shifted from each other with a predetermined voltage difference ΔV between them. The converter controller 224 includes a hysteresis comparator (not shown), which compares the current detection signal S8, which is a detection value of the driving current $I_{LED}$, with the upper threshold voltage VH and the lower threshold voltage VL. Furthermore, the converter controller 224 generates a control pulse S9 that corresponds to the comparison result. The converter controller 224 switches on and off a switching element of the switching converter 222 according to the control pulse S9.

The dimming signal generating unit 210 includes a position information generator 212, a waveform generator 214, and a period calculation unit 216. The period calculation unit 216 calculates a period TP of the periodic movement of the blade based on the position detection signal S4 received from the position detector 202. For example, in a case in which the position detection signal S4 is the output of a Hall comparator, the period calculation unit 216 measures the edge interval (half period) of the position detection signal S4. The period calculation unit 216 may be configured as a counter that counts the edge interval using a clock signal. The period calculation unit 216 outputs period information S5 that indicates the measured period.

The position information generator 212 generates position information S6 that indicates the position of the blade 100 for each time point, based on the period information S5 and the position detection signal S4. For example, the position information generator 212 may be configured as a counter that is reset for every edge of the position detection signal S4, and that counts up (or otherwise counts down) for every unit of time obtained by dividing the period TP by N (N represents an integer). The position information S6 represents the current scanning position θ, and represents the time point t. The waveform generator 214 generates the dimming signal S7 based on the light distribution pattern information S3 and the position information S6.

The correspondence relation between the position information S6 and the scanning coordinate position θ can be derived from a geometric layout relation between the light source 110 and the blade 100. The waveform generator 214 may include a table that holds the correspondence relation between the position information S6 and the scanning coordinate position θ. Also, the waveform generator 214 may hold a calculation expression that represents the correspondence relation between them.

Description has been made above regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

First Modification

Description has been made in the embodiment regarding an electronic swivel function. Also, the lighting circuit 200 may be employed to support a hot zone forming function. In this case, the light distribution pattern information S3 may preferably be generated such that a region to be brightly illuminated (peak position $\theta_{PEAK}$) is determined based on the camera information S1. Furthermore, the light distribution pattern information S3 thus generated may preferably be transmitted to the lighting circuit 200.

Second Modification

Figure 7A:
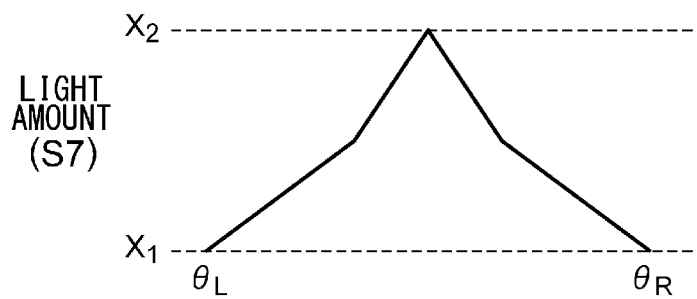
FIGS. 7A through 7C are waveform diagrams each showing the light amount of the light source according a modification.
Figure 7B:
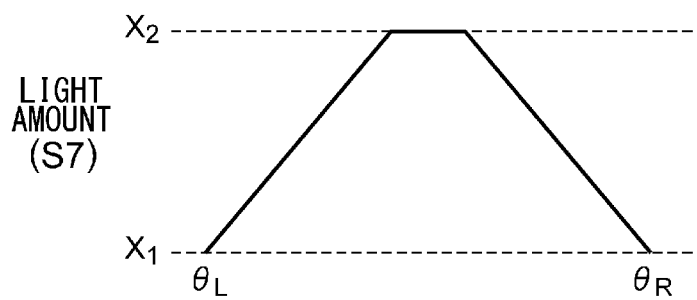
Figure 7C:
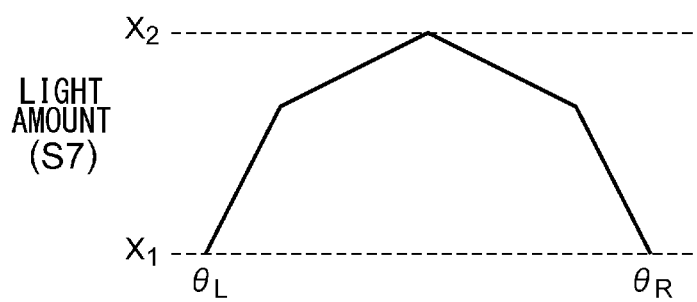

The waveforms of the dimming signal S7 shown in FIGS. 3 and 4 are shown for exemplary purposes only, and are not restricted in particular. FIGS. 7A through 7C are waveform diagrams each showing the light amount of the light source 110 according to a modification, and are waveform diagrams each showing the dimming signal S7. FIGS. 7A through 7C each show an arrangement in which the light distribution pattern 310 has the peak position $\theta_{PEAK}$ at its center. The waveforms of the dimming signal S7 shown in FIGS. 7A and 7C each have a slope that changes at intermediate positions. The waveform of the dimming signal S7 shown in FIG. 7B has a trapezoidal shape.

In the case of employing any one of the waveforms shown in FIGS. 7A through 7C, the method for changing the peak position $\theta_{PEAK}$ is not restricted in particular. For example, either the first control method or the second control method described above may be employed.

Third Modification

The position detecting method employed by the position detector 202 for detecting the position of the blade 100 is not restricted to such an arrangement employing a Hall element. For example, the position detector 202 may generate the position detection signal S4 by means of a rotary encoder for detecting the rotor position of the motor 130 using an optical method or other methods. Alternatively, the position detector 202 may include a photosensor arranged on the back side of the blade 100 and a position detection light source that emits light from the front side of the blade 100 toward the photosensor. With such an arrangement, a slit or otherwise a pinhole may be provided to the blade 100. Such an arrangement is capable of detecting a timing at which the slit or otherwise the pinhole passes through the top face of the photosensor. Such a slit may be configured as a gap between the two blades 100. Also, as the position detection light source, an infrared light source may be employed. Also, the light source 110 may be used as the position detection light source. As described above, various kinds of variations may be configured for the configuration of the position detector 202.

Fourth Modification

Description has been made in the embodiment regarding an arrangement in which the period $T_P$ is measured by means of the period calculation unit 216. However, the present invention is not restricted to such an arrangement. In a case in which the platform ensures that the motor 130 has a constant rotational speed, a predetermined value may be employed as the period $T_P$ of the movement of the blade 100. Also, in a case in which the lighting device ECU 206 is configured to control the rotational speed of the motor 130, such an arrangement allows the lighting device ECU 206 to directly acquire the period $T_P$ without the need for the position detection signal S4.

Fifth Modification

An arrangement may be made configured to support both the electronic swivel function and the glare-free function. In this case, the light distribution pattern information S3 further includes information that indicates the lighting on region and the lighting off region for the glare-free function. In this case, the dimming signal S7 may preferably to set to zero in the lighting off region.

Sixth Modification

Description has been made in the embodiment regrading an arrangement including a pair of blades 100. However, the number of blades is not restricted in particular. Specifically, the number of blades may be one or three or more. Description has been made regarding an arrangement in which the blade 100 is rotationally driven. Also, the blade 100 may be reciprocally driven.

Seventh Modification

As the light source 110, various kinds of semiconductor light sources may be employed in addition to an LED. Examples of such semiconductor light sources include LDs (laser diodes), organic EL (electroluminescence), and the like.

Eighth Modification

Figure 8A:
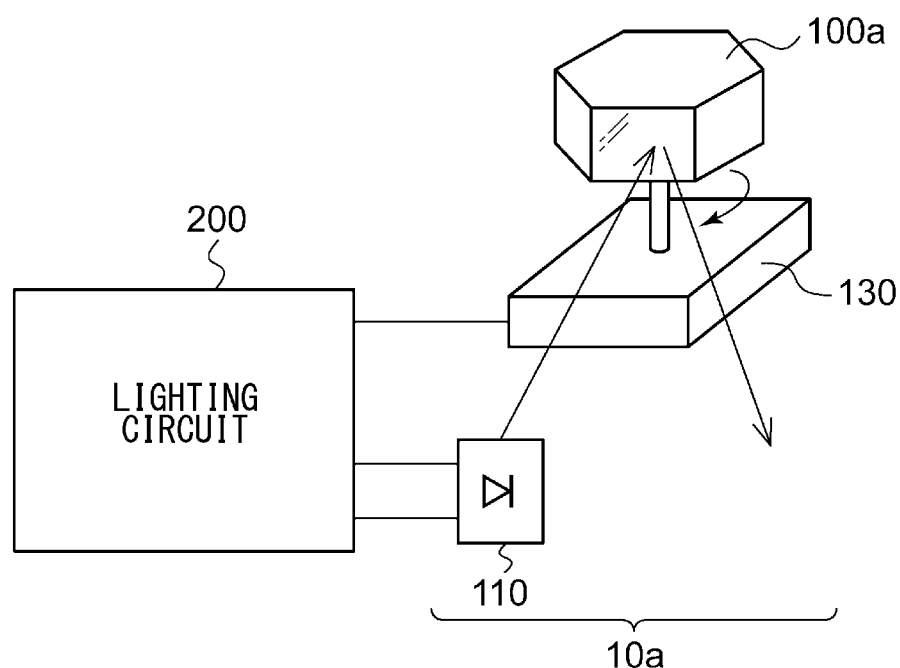
FIGS. 8A and 8B are diagrams each showing a modification of the scanning light source.
Figure 8B:
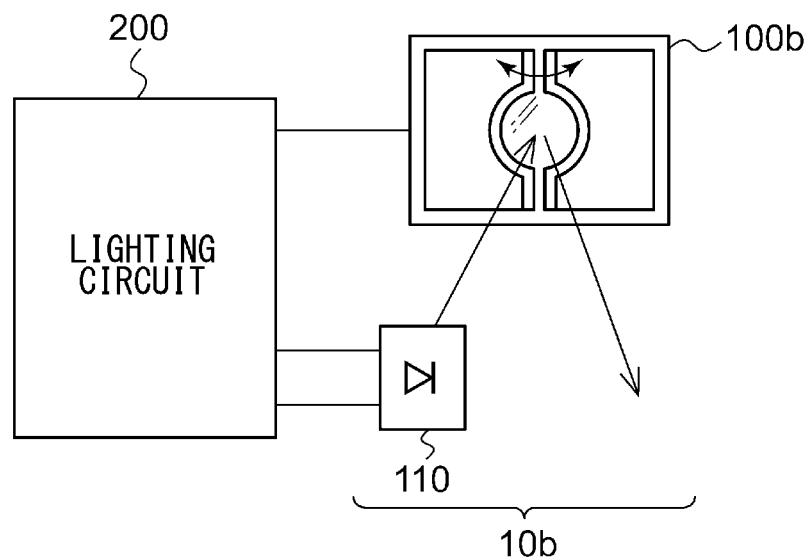

Also, various modifications may be made for the configuration of the scanning light source 10. Description has been made in the embodiment regarding an arrangement in which the blade 100 is employed as a reflector. However, the present invention is not restricted to such an arrangement. FIGS. 8A and 8B are diagrams each showing a modification of the scanning light source 10. Scanning light sources 10a and 10b shown in FIGS. 8A and 8B are each configured as a combination of the light source 110 and a reflector as with the arrangement shown in FIG. 1. The reflector shown in FIG. 8A is a polygonal mirror 100a. The reflector may be configured as a mirror galvanometer. The reflector shown in FIG. 8B is a MEMS (Micro Electro Mechanical System) scan mirror 100b.

Ninth Modification

Figure 9A:
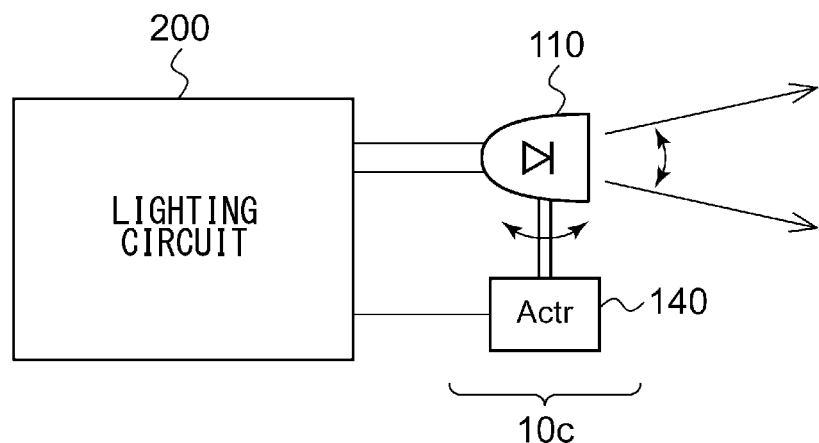
FIGS. 9A and 9B are block diagrams each showing a lighting device system including a scanning light source according to a ninth modification.
Figure 9B:
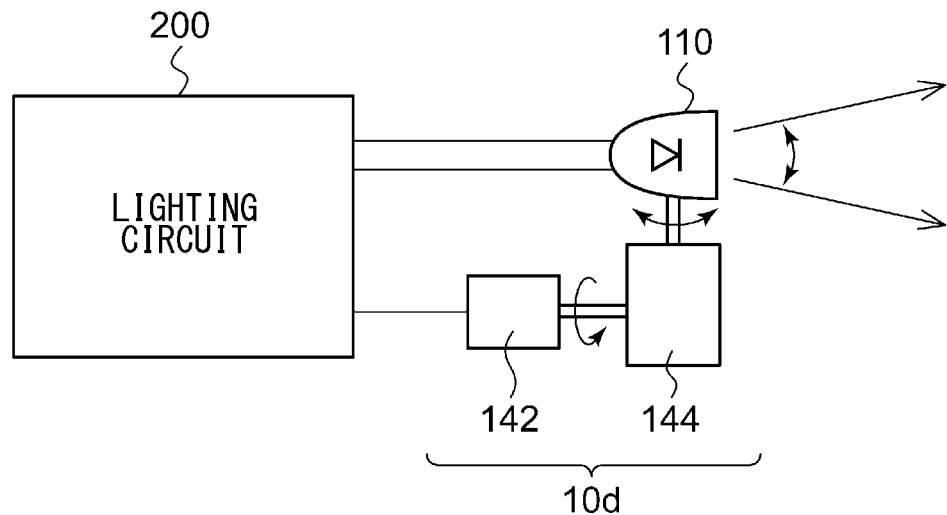

FIGS. 9A and 9B are block diagrams respectively showing lighting device systems including scanning light sources 10c and 10d according to a ninth modification. In the scanning light source 10c shown in FIG. 9A, an actuator 140 configured as a driving mechanism is mounted on the light source 110. The actuator 140 allows swiveling (or leveling) of the optical axis of the light source 110.

The scanning light source 10d shown in FIG. 9B includes a motor 142 and a conversion apparatus 144 instead of the actuator 140. The conversion apparatus 144 is a driving mechanism that receives the rotation of the motor 142 as its input, converts the rotation into reciprocal movement, and outputs the reciprocal movement. By applying the reciprocal movement output from the conversion apparatus 144 to the light source 110, this allows the optical axis thereof to be swiveled.

Tenth Modification

Figure 10:
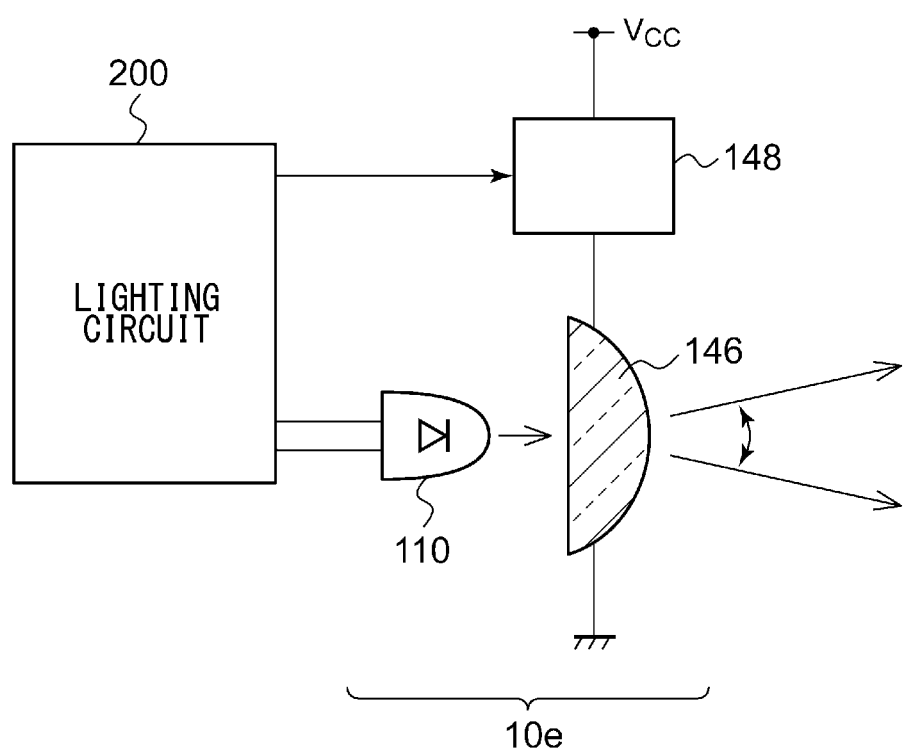
FIG. 10 is a block diagram showing a lighting device system including a scanning light source according to a tenth modification.

FIG. 10 is a block diagram showing a lighting device system including a scanning light source 10e according to a tenth modification. The scanning light source 10e includes an electro-optical element 146 having electrically controllable optical characteristics. For example, the electro-optical element 146 may be a lens having a refractive index that can be controlled according to a current, temperature, or the like. A refractive index control unit 148 periodically changes the refractive index of the lens so as to scan the light.

Eleventh Modification

Figure 11A:
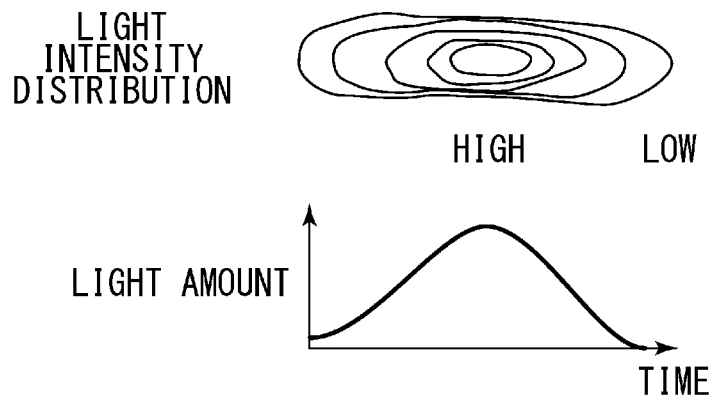
FIGS. 11A through 11C are diagrams each showing a spatial beam intensity distribution and a temporal waveform of the light amount.
Figure 11B:
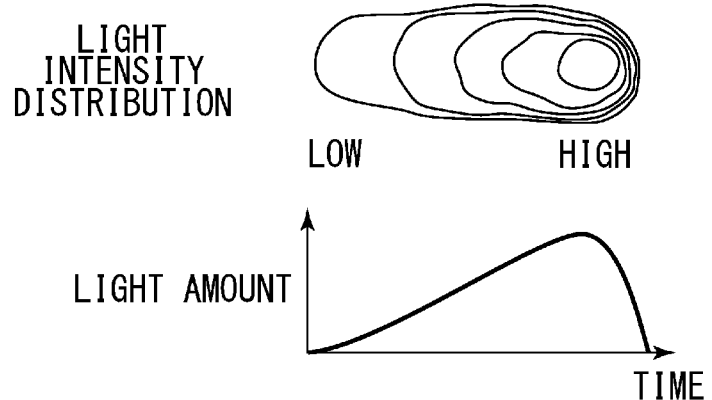
Figure 11C:
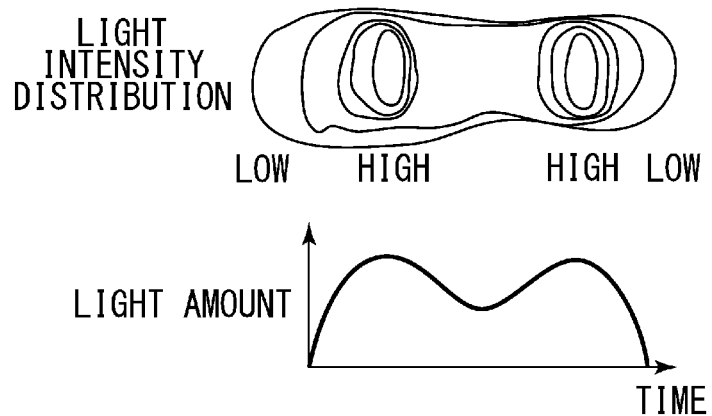

The vehicular lighting device 1 may support another function in addition to or instead of the electronic swivel function. FIGS. 11A through 11C are diagrams each showing a spatial beam intensity distribution and a temporal waveform of the light amount. FIG. 11A corresponds to a normal high-beam light distribution. FIG. 11B corresponds to the aforementioned electronic swivel function. FIG. 11C corresponds to light distribution to be set in the case of rain.

Twelfth Modification

Description has been made in the embodiment regarding an arrangement in which the optical axis is swiveled in a single direction (horizontal direction). However, the present invention is not restricted to such an arrangement. For example, with the scanning light source 10b shown in FIG. 8B, a two-axis movable MEMS mirror may be employed, or otherwise a pair of MEMS mirrors may be combined. This allows the optical axis to be scanned in the vertical direction (leveling), in addition to being scanned in the horizontal direction (swiveling). An arrangement employing a pair of mirror galvanometers may be made, which provides the same effect. Also, with the scanning light source 10c shown in FIG. 9A, the actuator may be configured as a two-axis movable actuator, which provides the same effect.

Figure 12A:
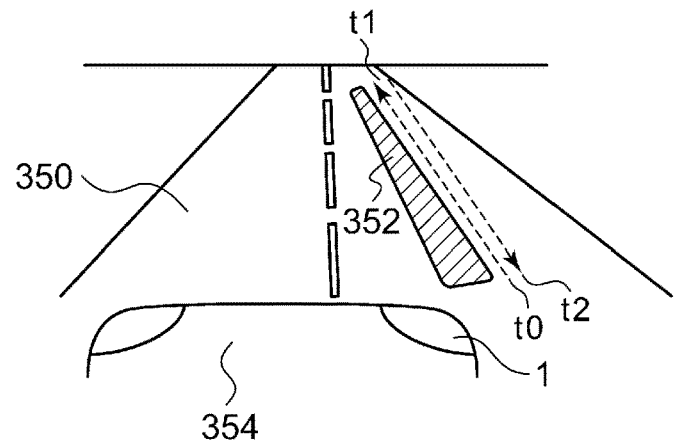
FIGS. 12A and 12B are diagrams showing an example of drawing on a road surface.
Figure 12B:
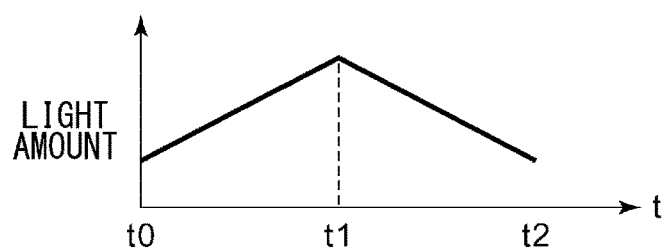

With the combination including the scanning light source 10 that supports scanning in both the horizontal direction and the vertical direction, the lighting circuit 200 may support a road surface drawing function of drawing desired shapes or letters on the road surface. FIGS. 12A and 12B are diagrams showing an example of road surface drawing. FIG. 12A shows an example of a road surface 350 and a pattern 352 drawn on the road surface 350. FIG. 12B shows a temporal waveform of the light amount that corresponds to the pattern 352 shown in FIG. 12A. The beam (illumination region 300) is reciprocally scanned in the up-and-down direction (vertical direction) with a period from the time point t0 to t1 as one cycle. The lighting circuit 200 may raise the light amount according to an increase in the distance between the vehicle and the position illuminated by the beam. In this case, it should be noted that the temporal waveform of the light amount that corresponds to FIG. 12A is adjusted according to a monotonically increasing/decreasing pattern in the same manner as shown in FIGS. 3 and 4. This provides uniform light intensity over the road surface 350 regardless of the distance from the user's vehicle 354, thereby providing improved visibility as viewed from the user's vehicle 354 or other vehicles.

Figure 13A:
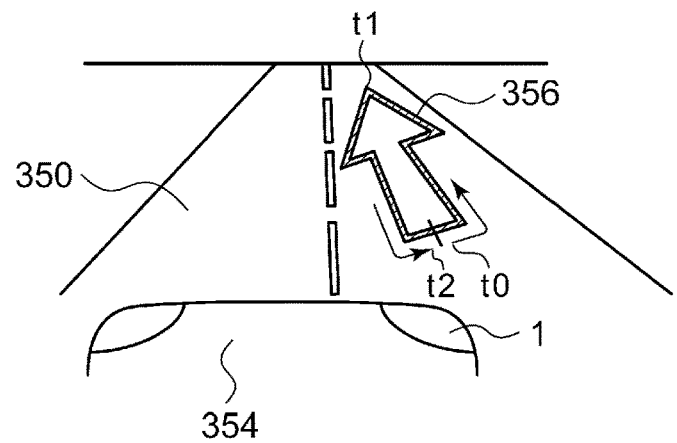
FIGS. 13A and 13B are diagrams showing another example of drawing on a road surface.
Figure 13B:
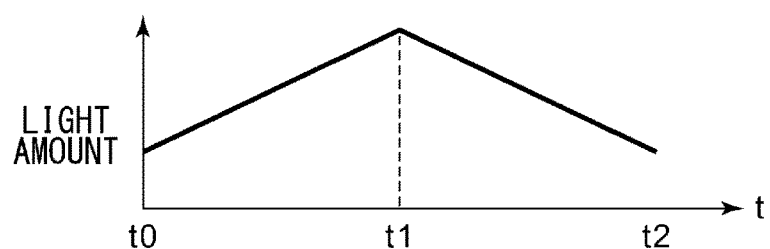

FIGS. 13A and 13B are diagrams showing another example of road surface drawing. FIG. 13A shows another example of the road surface 350 and a pattern 356 drawn on the road surface 350. Description will be made below regarding an arrangement in which the arrow-shaped pattern 356 is drawn in a single stroke. The beam is repeatedly scanned in a counterclockwise manner with a period from the time point t0 to t2 as one cycle. FIG. 13B shows a temporal waveform of the light amount that corresponds to the pattern 356 shown in FIG. 13A. In this example, the lighting circuit 200 may also raise the light amount according to an increase in the distance between the vehicle and the position illuminated by the beam. The temporal waveform of the light amount shown in FIG. 13B is also adjusted according to a monotonically increasing/decreasing pattern in the same manner as shown in FIGS. 3 and 4. This provides uniform light intensity over the road surface 350, thereby providing improved visibility as viewed from the user's vehicle 354 or other vehicles.

Description has been made in the embodiment regarding an arrangement in which the luminance (light amount) of the light source 110 is controlled in multiple levels. Also, the light amount of the light source 110 may be changed continuously, i.e., in a non-discrete manner. For example, a capacitor may be charged and discharged by means of a constant current source or otherwise a resistor, and the voltage across the capacitor that occurs as a result of the charging and discharging may be used as the dimming signal S7. This allows the light amount to be changed continuously.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A vehicular lighting device comprising:
a scanning light source comprising:
a semiconductor light source; and
a reflector structured to receive an output light of the semiconductor light source, and to scan a reflected light thereof in a forward region ahead of the lighting device by repeating a predetermined periodic movement; and
a lighting circuit structured to change a light amount of the semiconductor light source in a multiplicity of levels in synchronization with the movement of the reflector, in synchronization with the scanning of the scanning light source, wherein the lighting circuit is structured to drive the semiconductor light source such that an intensity distribution of a beam emitted to the forward region monotonically increases or otherwise monotonically decreases with a peak position as a base point.

2. The vehicular lighting device according to claim 1, wherein the light amount of the semiconductor light source is set to a predetermined base value at a start time point that corresponds to one end of a light distribution pattern formed in the forward region,
wherein the light amount of the semiconductor light source is set to a peak value at a peak time point that corresponds to the peak position,
and wherein the light amount of the semiconductor light source is set to the base value at an end time point that corresponds to the other end of the light distribution pattern.

3. The vehicular lighting device according to claim 1, wherein the lighting circuit is structured to control the light amount of the semiconductor light source by shifting a predetermined basic waveform along a time axis according to the peak position.

4. The vehicular lighting device according to claim 3, wherein the basic waveform includes a first period in which a value thereof is set to a base value, a second period in which the value thereof is monotonically increased from the base value to a peak value, a third period in which the value thereof is monotonically reduced from the peak value to the base value, and a fourth period in which the value thereof is set to the base value.

5. The vehicular lighting device according to claim 1, wherein the light amount of the semiconductor light source is changed with a constant slope.

6. The vehicular lighting device according to claim 1, wherein the peak position corresponds to at least one from among steering angle information and camera information.

7. The vehicular lighting device according to claim 1, wherein the vehicular lighting device is structured to draw a pattern on a road surface, and wherein the peak position corresponds to an end of the pattern that is most distant from a vehicle.

8. A vehicular lighting device comprising:
a scanning light source comprising:
a semiconductor light source; and
a reflector structured to receive an output light of the semiconductor light source, and to scan a reflected light thereof in a forward region ahead of the lighting device by repeating a predetermined periodic movement; and
a lighting circuit structured to change a light amount of the semiconductor light source in a multiplicity of levels in synchronization with the movement of the reflector, in synchronization with the scanning of the scanning light source, wherein the lighting circuit comprises a constant current driver structured to supply a driving current to the semiconductor light source,
and wherein the constant current driver comprises:
a switching converter; and
a converter controller employing a hysteresis control method, structured to compare a detection value of the driving current with an upper threshold value and a lower threshold value that correspond to a target value of the light amount of the semiconductor light source, and to drive the switching converter according to a comparison result.

9. The vehicular lighting device according to claim 8, wherein the lighting circuit further comprises a dimming signal generating unit structured to generate a dimming signal that periodically changes in a multiplicity of levels in synchronization with a movement of a reflector, and wherein the constant current driver is structured to supply the driving current that corresponds to the dimming signal to the semiconductor light source.

10. The vehicular lighting device according to claim 9, wherein the dimming signal generating unit comprises a position detector structured to generate a position detection signal that indicates a timing at which a predetermined reference portion of the reflector aligns with a predetermined position, and wherein the dimming signal generating unit is structured to generate the dimming signal in synchronization with the position detection signal.

11. The vehicular lighting device according to claim 1, wherein the reflector is configured as a rotating reflector.

12. The vehicular lighting device according to claim 10, wherein the reflector comprises two blades, and wherein the reference portion is defined as a gap between the two blades.

13. The vehicular lighting device according to claim 8, wherein the reflector is configured as a rotating reflector.

* * * * *